United States Patent [19]
Hashimoto et al.

[11] Patent Number: 5,916,963
[45] Date of Patent: Jun. 29, 1999

[54] WATER-BASED RESIN DISPERSION AND PROCESS FOR THE PRODUCTION THEREOF

[75] Inventors: Tomio Hashimoto; Tsuyoshi Kitamoto, both of Tokyo, Japan

[73] Assignee: Toyo Ink Manufacturing Co., Ltd., Tokyo, Japan

[21] Appl. No.: 08/875,726

[22] PCT Filed: Dec. 18, 1996

[86] PCT No.: PCT/JP96/03680

§ 371 Date: Aug. 4, 1997

§ 102(e) Date: Aug. 4, 1997

[87] PCT Pub. No.: WO97/22641

PCT Pub. Date: Jun. 26, 1997

[30] Foreign Application Priority Data

Dec. 19, 1995 [GB] United Kingdom ............... 330056/95
Jun. 26, 1996 [GB] United Kingdom ............... 165014/96

[51] Int. Cl.$^6$ ........................................... C08L 83/00
[52] U.S. Cl. ..................... 524/588; 524/819; 526/279
[58] Field of Search ............... 526/279; 524/588, 524/819

[56] References Cited

U.S. PATENT DOCUMENTS 5,516,868  5/1996  Yamazaki et al. ............... 526/279
5,698,628  12/1997  Masuda et al. .................. 526/279

FOREIGN PATENT DOCUMENTS 0050248  4/1982  European Pat. Off. ............... 526/279

Primary Examiner—Bernard Lipman
Assistant Examiner—N. Sarofim
Attorney, Agent, or Firm—Wenderoth, Lind & Ponack, L.L.P.

[57] ABSTRACT

A water-based resin dispersion having excellent durability against water, obtained by radical-polymerizing a radical-polymerizable ethylenically unsaturated monomer, a dimethylpolysiloxane having a molecule containing a radical-polymerizable unsaturated double bond and a radical-polymerizable monomer of the formula (A) or (B) in the presence of a reactive emulsifier, an oil-soluble polymerization initiator and water, and a process for the production thereof,

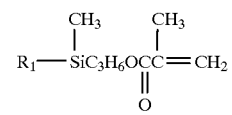

(A)

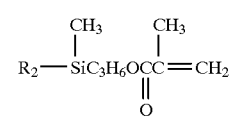

(B)

wherein $R_1$ is $(C_2H_5O)_2$ or $(CH_3O)_2$, and $R_2$ is $(C_2H_5O)_3$ or $(CH_3O)$.

13 Claims, No Drawings

WATER-BASED RESIN DISPERSION AND PROCESS FOR THE PRODUCTION THEREOF

FIELD OF THE INVENTION

The present invention relates to a water-based resin dispersion having excellent durability against water. More specifically, it relates to a water-based resin dispersion which contains a dispersed resin having a dimethylpolysiloxane-containing molecular structure and having fine particle diameters and which has excellent durability against water.

The water-based resin dispersion of the present invention can be applied to an undercoat formed on various substrates such as a coating composition, a synthetic resin, glass, ceramic, gypsum, paper, wood, light-weight concrete, mortar, a calcium silicate plate, a slate, a plasterboard, and the like to form a coating excellent in durability against water, weathering resistance, pollution resistance and chemical resistance.

TECHNICAL BACKGROUND

In recent years, there is a trend toward the use of water-based coating compositions, particularly aqueous emulsion-based coating compositions, since organic solvent-containing coating compositions are undesirable in view of effective utilization of resources.

However, in general aqueous emulsion-based coating compositions, at a drying time, water is dissipated from an emulsion-polymerized resin dispersed in water, and the particles of the resin are mutually fused to each other to form a coating, so that the formed coating is poor in denseness and is therefore poor in durability against water as compared with organic solvent-containing coating compositions.

For overcoming the above defect, there is known a method in which the a resin obtained by emulsion-polymerization is extremely decreased in diameter to improve the denseness of a coating. Even if a dense coating is formed, however, it is impossible to attain the durability against water, weathering resistance and pollution resistance equivalent to those attained by a silicon-containing polymer.

As a method of improving a coating in durability against water, weathering resistance and water repellency, there is known a method in which a resin is synthesized by copolymerizing dimethylpolysiloxane having a radical-polymerizable double bond. However, when the resin is synthesized in an emulsion polymerization system, various problems are caused. For example, a dimethylpolysiloxane having a radical-polymerizable double bond shows poor reactivity with an ethylenically unsaturated monomer since the dimethylpolysiloxane has a high molecular weight, as high as 1,000 to 10,000, and as a result, at an emulsion polymerization time, aggregates are formed, or gelation or separation from water takes place. There is therefore a defect that it is difficult to obtain a water-based dispersion stable with the passage of time.

Further, a resin dispersion obtained by the above method is an emulsion having large particle diameters in most cases. Therefore, even if a dimethylpolysiloxane excellent in durability against water, weathering resistance and water repellency is used for modification, the defect is that no effect produced by the modification with silicone can be obtained due to a coating defect caused by the fact that the resin has a large particle diameter.

It is an object of the present invention to provide a water-based resin dispersion which is modified with dimethylpolysiloxane and is stable with the passage of time, whose resin has a very fine particle diameter and which has excellent durability against water.

DISCLOSURE OF THE INVENTION

The present invention provides a water-based resin dispersion having excellent durability against water, obtained by radical-polymerizing a radical-polymerizable ethylenically unsaturated monomer, a dimethylpolysiloxane having a molecule containing a radical-polymerizable unsaturated double bond and a radical-polymerizable monomer of the formula (A) or (B) in the presence of a reactive emulsifier, an oil-soluble polymerization initiator and water,

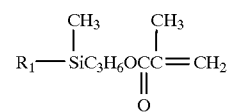

(A)

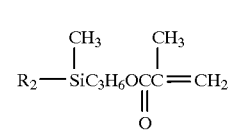

(B)

wherein $R_1$ is $(C_2H_5O)_2$ or $(CH_3O)_2$, and $R_2$ is $(C_2H_5O)_3$ or $(CH_3O)_3$.

The present invention further provides a process for the production of a water-based resin dispersion having excellent durability against water, which comprises preparing oil drops from a radical-polymerizable ethylenically unsaturated monomer, a dimethylpolysiloxane having a molecule containing a radical-polymerizable unsaturated double bond and a radical-polymerizable monomer of the formula (A) or (B) and adding the oil drops into water together with a reactive emulsifier and an oil-soluble polymerization initiator to proceed with radial polymerization.

PREFERRED EMBODIMENTS OF THE INVENTION

The radical-polymerizable ethylenically unsaturated monomer used in the present invention includes an ethylenically unsaturated monomer having a carboxyl group, a bifunctional monomer having an ethylenically unsaturated group and other monomers having an ethylenically unsaturated group in addition to alkyl ester of (meth)acrylic acid. Specific examples of these compounds are as follows.

(Meth)acrylate esters such as methyl acrylate, ethyl acrylate, butyl acrylate, 2-ethylhexyl acrylate, methyl methacrylate, ethyl methacrylate, 2-ethylhexyl methacrylate, octyl methacrylate, stearyl methacrylate and cyclohexyl methacrylate, styrene, α-methylstyrene, vinyltoluene, vinyl acetate and vinyl propionate.

The monomer having a carboxyl group includes acrylic acid, methacrylic acid, maleic acid, fumaric acid and itaconic acid.

The bifunctional monomer having an ethylenically unsaturated group includes ethylene glycol dimethacrylate, diallyl phthalate, divinylbenzene and glycidyl methacrylate.

The other monomers having an ethylenically unsaturated group include acrylamide, N-methylolacrylamide, hydroxyethyl acrylate, hydroxypropyl acrylate and hydroxyethyl methacrylate.

A monomer having a carboxyl group may be used as part of the above radical-polymerizable ethylenically unsaturated monomer. The monomer having a carboxyl group is preferably used in combination for improving stability at a time of production or during the storage of the water-based resin dispersion. For the above purpose, the amount of the monomer having a carboxyl group is preferably used in an amount of 0 to 5% by weight, preferably 0.5 to 5% by weight, when the total amount of the monomer having a carboxyl group and the radical-polymerizable ethylenically unsaturated monomer is 100% by weight. When the amount of the monomer having a carboxyl group is less than 0.5%, there is no desirable effect on polymerization stability and viscosity stability with the passage of time. Further, when the above amount exceeds 5% by weight, an obtained coating is poor in durability against water.

The other monomer having an ethylenically unsaturated group, such as acrylamide, N-methylolacrylamide, or the like is preferably used as part of the radical-polymerizable ethylenically unsaturated monomer for improving fluidity, adjustment of drying properties and stability during resin storage. The above other monomer is used in an amount of 0 to 10% by weight, preferably 0.5 to 10% by weight, when the total amount of the ethylenically unsaturated monomer and the above other monomer is 100% by weight.

The bifunctional monomer such as ethylene glycol dimethacrylate, diallyl phthalate, or the like may be used as part of the radical-polymerizable ethylenically unsaturated monomer. The bifunctional monomer is used for imparting a coating with a crosslinked structure. The bifunctional monomer is used in an amount of 0 to 5% by weight, preferably 0.1 to 10% by weight when the total amount of the bifunctional monomer and the radical-polymerizable ethylenically unsaturated monomer is 100% by weight.

The radical-polymerizable monomer of the formula (A) or (B) used in the present invention, which is an alkoxysilane monomer, is employed for imparting a coating with a crosslinked structure. Examples thereof are as follows. β-methacryloxypropylmethyldimethoxysilane, β-methacryloxypropylmethyldiethoxysilane, β-methacryloxypropyltrimethoxysilane and β-methacryloxypropyltriethoxysilane.

The above alkoxysilane monomers may be used alone or in combination of at least two of them. The radical-polymerizable monomer of the formula (A) or (B) is used in an amount of 0.1 to 10 parts by weight, preferably 0.5 to 5 parts by weight, per 100 parts by weight of the radical-polymerizable ethylenically unsaturated monomer. When the amount of the above radical-polymerizable monomer is less than 0.1 part by weight, an obtained coating is poor in durability against water. When it exceeds 10 parts by weight, an obtained coating undergoes cracking.

The dimethylpolysiloxane having a radical-polymerizable unsaturated double bond used in the present invention refers to a polysiloxane having a molecule containing at least one radical-polymerizable unsaturated double bond. For example, it includes methacryloxy-terminated dimethylpolysiloxanes of the following formulae (1) and (2) (commercially available are, for example, X-22-164B and X-22-174DX, supplied by The Shin-Etsu Chemical Co., Ltd., and Silaplain FM2231, FP2241, FM0711, FM0721 and FM-0725, supplied by Chisso Corp.), and dimethylpolysiloxane having a methcryloxy group as a side chain, represented by the following formula (3).

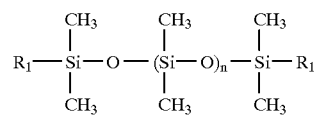

(1)

wherein $R^1$ is —CH=CH$_2$ or

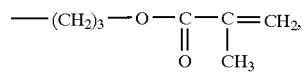

and n is an an integer of at least 1.

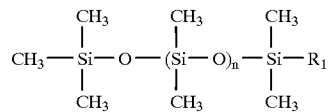

(2)

wherein $R^1$ is —CH=CH$_2$ or

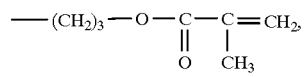

and n is an integer of at least 1.

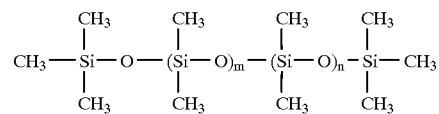

(3)

wherein n is an integer of at least 1, and m is an integer of at least 20.

In the polymerization, the above dimethylpolysiloxanes may be used alone in combination of at least two of them. Preferably, the dimethylpolysiloxane has a molecular weight of 1,000 to 10,000, and used in an amount of 0.1 to 20 parts by weight, more preferably 0.5 to 10 parts by weight, per 100 parts by weight of the radical-polymerizable ethylenically unsaturated monomer.

When the amount of the dimethylpolysiloxane is greater than the above upper limit, the reactivity with the radical-polymerizable ethylenically unsaturated monomer decreases, which causes the occurrence of a residual monomer or bleeding out of dimethylpolysiloxane. When the amount of the dimethylpolysiloxane is smaller than the above lower limit, undesirably, an obtained coating shows insufficient water repellency.

The process for the polymerization in the present invention will be explained hereinafter. For the polymerization, the ethylenically unsaturated monomer, the radical-polymerizable monomer of the formula (A) or (B), the dimethylsiloxane, an activator and a remaining portion of the polymerization initiator are dropwise added, in the form of oil drops, to water in a container. Preferably, the container is charged with a reactive activator and part of the oil-soluble polymerization initiator in addition to water in advance, and the activator, a remaining portion of the initiator and the monomers are dropwise added in the form of oil drops. The oil drops added dropwise preferably have a diameter of 0.5 μm or less. When the diameter of the oil drops exceeds 0.5 μm, the polymerization stability is poor, and aggregates are liable to be formed. For decreasing the diameter of the oil drops, a homomixer, a line mixer or a high-pressure homogenizer may be used. A pipeline mixer is the most preferred. With this mixture, there can be obtained intended oil drops having a narrow oil diameter distribution for short period of time. The oil drops can be measured for diameters a laser analysis-applied fine particle diameter measuring apparatus or an optical microscope.

The reactive emulsifier used in the present invention refers to an anionic or nonionic emulsifier having a molecule containing at least one radical-polymerizable unsaturated double bond. For example, the reactive emulsifier includes sulfosuccinate esters of the following formulae (4) and (5) (commercially available are Latemul S-120P and S-180A supplied by Kao Corp. and Eleminol JS-2 supplied by Sanyo Chemical Industry Co., Ltd.) and alkyl phenol esters of the following formula (6) (commercially available are Aquaron Aqyaron HS-10 and RN-20, supplied by Daiichi Kogyo Seiyaku).

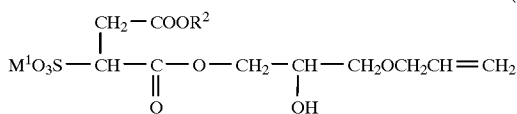

(4)

wherein $M^1$ is Na, K or NH4 and $R^2$ is $C_{12}H_{25}$.

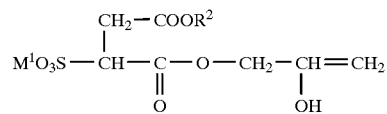

(5)

wherein $M^1$ is Na, K or NH4 and $R^2$ is $C_{12}H_{25}$.

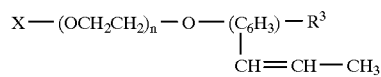

(6)

wherein X is H, $SO_3Na$, $SO_3K$ or $SO_3NH_4$, $R^3$ is a $C_9H_{19}$ and n is 0 to 200.

In the polymerization, the emulsifiers may be used alone or in combination of at least two of them.

Preferably, the above emulsifier is used in an amount of 0.1 to 10 parts by weight per 100 parts by weight of the radical-polymerizable ethylenically unsaturated monomer. When the amount of the emulsifier exceeds 10 parts by weight, the particle diameter is small, while there is an adverse effect or the durability against water is poor since the amount of the emulsifier is large.

When the above emulsifier has no reactivity, the durability against water is inevitably low due to the elution of the activator even if a stable resin dispersion is obtained.

Another characteristic feature of the present invention is the use of an oil-soluble initiator as a polymerization intiator. When the monomers are polymerized by radial-decomposing a water-soluble persulfate, a peroxide and an azobis compound in place of the oil-soluble polymerization initiator under heat or a redox reaction based on a reducing substance, the particle diameter increases in the step of polymerization, and a coating shows poor durability against water. In the present invention, the oil-soluble polymerization initiator refers to an initiator having a characteristic feature in that the solubility in water is 1% by weight or less, preferably 0.3% by weight or less.

The oil-soluble polymerization initiator is preferably selected from tert-butyl perbenzoate, lauryl peroxide, benzoyl peroxide, tert-butyl hydroperoxide, azobisisobutyronitrile, azobisdimethylbutyronitrile, or azobisvaleronitrile. These above oil-soluble polymerization initiators may be used alone or in combination. Further, the oil-soluble polymerization initiator may be used in a redox form in combination with a reducing agent such as sodium erysorbate.

The oil-soluble polymerization initiator may be used in an amount of 0.1 to 10 parts by weight per 100 parts by weight of the radial-polymerizable ethylenically unsaturated monomer.

In the present invention, it is preferred to add a transition metal ion such as copper ion from cupric sulfate or cupric chloride or ions from ferric sulfate or ferric chloride in an amount of $10^{-7}$ to $10^{-5}$ mol/litter based on the water charged in a reactor. The transition metal ion promotes the emulsion polymerization.

The water-based resin dispersion of the present invention has an average particle diameter of 120 nm or less, preferably 100 nm or less. When the above average particle diameter exceeds 120 nm, the water-based resin dispersion having excellent durability against water as and end product in the present invention is no longer obtained.

The present invention will be explained with reference to Examples hereinafter, in which "part" stands for "part by weight" and "%" stands for "% by weight".

EXAMPLE 1

A reactor having a stirrer, a thermometer, a dropping funnel and a refluxing device was charged with part of a reactive emulsifier in advance as shown in Table 1, and was saturated with nitrogen gas. Raw materials shown in Table 1, to be dropwise added, were treated with a pipeline mixer in advance to adjust the diameter of oil drops to 0.5 μm or less. The internal temperature of the reactor was increased to 80° C., and part of a polymerization initiator was charged into the reactor. After 5 minutes, the dropwise addition was initiated. The dropwise addition of the raw materials in total amounts was completed in 2 hours, and further, the reaction mixture was aged at 80° C. for 2 hours. Then, the reaction mixture was cooled, and adjusted to a pH of 8~9 with aqueous ammonia. The oil drops and the water-based resin dispersion were measured for particle diameters with a laser analysis-applied fine particle diameter measuring apparatus (nanonizer Supplied by Cortar Co.,Ltd. ). There was obtained a resin dispersion having a solid content of 40.0%, a viscosity of 4,200 cps and a particle diameter of 68 nm.

TABLE 1

| Raw material | Total amount | Initially charged amount | Amount by dropwise addition |
| --- | --- | --- | --- |
| Ethylenically unsaturated monomer | | | |
| Methyl methacrylate | 204.8 | 0 | 204.8 |
| Butyl acrylate | 140.0 | 0 | 140.0 |
| Acrylic acid | 8.0 | 0 | 8.0 |
| Dimethylpolysiloxane | (11.3%) | | |
| Polysiloxane*1 | 40.0 | 0 | 40.0 |

TABLE 1-continued

| Raw material | Total amount | Initially charged amount | Amount by dropwise addition |
|---|---|---|---|
| Alkoxysilane monomer | (3.4%) | | |
| Ethoxysilane*2 | 12.0 | 0 | 12.0 |
| Reactive emulsifier | (5.7%) | | |
| JS-2*3 | 52.6 | 26.3 | 26.3 |
| Polymerization initiator | | | |
| Hexanate*4 | 3.0 | 0.5 | 2.5 |
| Deionized water | 589.6 | | |
| Total | 1,050.0 | | |

Notes: *1; Methacryloxydimethylpolysiloxane Mw = 5,000
*2; Methacryloxypropylmethyldiethoxysilane Mw = 260
*3; Eleminol JS-2 (active ingredient 38%, supplied by Sanyo Chemical Industry Co., Ltd.)
*4; t-butylperoxy 2-ethylhexanate
Parenthesized values are percentages based on the ethylenically unsaturated monomer.

EXAMPLE 2–6

Resin dispersions were obtained in the same manner as in Example 1 except that the ethylenically unsaturated monomer, the amount of the dimethylpolysiloxane and the kinds of the alkoxysilane monomer and the reactive emulsifier were changed as shown in Table 2.

TABLE 2

| | Example | | |
|---|---|---|---|
| Raw material | 2 | 3 | 4 |
| Ethylenically unsaturated monomer | | | |
| Methyl methacrylate | 164.0 | 240.0 | 241.0 |
| Cyclohxyl methacrylate | — | — | — |
| Ethyl acrylate | 200.0 | — | — |
| Butyl acrylate | — | 92.0 | 139.0 |
| 2-Ethylhexyl acrylate | — | — | — |
| Styrene | — | — | — |
| Acrylic acid | — | — | 10.0 |
| Methacrylic acid | 12.0 | 8.0 | — |
| Glycidyl methacrylate | | | |
| Dimethyl-polysiloxane | (5.3%) | (17.6%) | (2.6%) |
| Polysiloxane*1 | 20.0 | 60.0 | 10.0 |
| Alkoxysilane monomer | (5.3%) | (8.8%) | (3.1%) |
| Ethoxysilane*2 | 20.0 | — | 12.0 |
| Methoxysilane*3 | — | 30.0 | — |
| Reactive emulsifier | (3.2%) | (9.4%) | (5.1%) |
| JS-2*4 | 31.6 | — | — |
| Latemul S-180*5 | — | 106.7 | — |
| Aquaron HS-10*6 | — | — | 20.4 |
| Polymerization initiator | | | |
| Hexanate*7 | 3.0 | 3.0 | 3.0 |
| Deionized water | 595.4 | 510.3 | 614.6 |
| Total | 1,050.0 | 1,050.0 | 1,050.0 |

Notes: *1; Methacryloxydimethylpolysiloxane
*2; γ-Methacryloxypropylmethyldiethoxysilane
*3; γ-Methacryloxypropylmethyldimethoxysilane
*4; Eleminol JS-2
*5; Latemul S-180 (active ingredient 30%, supplied by Kao Corp.)
*6; Aquaron HS-10 (active ingredient 98%, supplied by Daiichi Kogyo Seiyaku)
*7; t-butylperoxy 2-ethylhexanate
Parenthesized values are percentages based on the ethylenically unsaturated monomer.

TABLE 2-continued

| | Example | |
|---|---|---|
| Raw material | 5 | 6 |
| Ethylenically unsaturated monomer | | |
| Methyl methacrylate | 158.0 | — |
| Cyclohxyl methacrylate | — | 200.0 |
| Ethyl acrylate | — | — |
| Butyl acrylate | — | 153.5 |
| 2-Ethylhexyl acrylate | 120.0 | — |
| Styrene | 80.0 | — |
| Acrylic acid | 2.0 | — |
| Methacrylic acid | — | 16.5 |
| Glycidyl methacrylate | | |
| Dimethyl-polysiloxane | (11.1%) | (8.1%) |
| Polysiloxane*1 | 40.0 | 30.0 |
| Alkoxysilane monomer | (5.6%) | (0.5%) |
| Ethoxysilane*2 | 20.0 | 1.9 |
| Methoxysilane*3 | — | — |
| Reactive emulsifier | (5.6%) | (9.6%) |
| JS-2*4 | 52.6 | — |
| Latemul S-180*5 | — | 120.0 |
| Aquaron HS-10*6 | — | — |
| Polymerization initiator | | |
| Hexanate*7 | 3.0 | 3.0 |
| Deionized water | 574.4 | 525.1 |
| Total | 1,050.0 | 1,050.0 |

Notes: *1; Methacryloxydimethylpolysiloxane
*2; γ-Methacryloxypropylmethyldiethoxysilane
*3; γ-Methacryloxypropylmethyldimethoxysilane
*4; Eleminol JS-2
*5; Latemul S-180 (active ingredient 30%, supplied by Kao Corp.)
*6; Aquaron HS-10 (active ingredient 98%, supplied by Daiichi Kogyo Seiyaku)
*7; t-butylperoxy 2-ethylhexanate
Parenthesized values are percentages based on the ethylenically unsaturated monomer.

Comparative Examples 1 and 2

Resin dispersions were prepared in the same manner as in Example 1 except that neither a dimethylpolysiloxane nor an alkoxysilane monomer is used (Comparative Example 1) or that a dimethylpolysiloxane having no unsaturated double bond is used (Comparative Example 2).

TABLE 3

| | Comparative Example | |
|---|---|---|
| Raw material | 1 | 2 |
| Ethylenically unsaturated monomer | | |
| Methyl methacrylate | 244.8 | 212.0 |
| Butyl acrylate | 140.0 | 140.0 |
| Acrylic acid | 8.0 | 8.0 |
| Dimethylpolysiloxane | | (8.3%) |
| Polysiloxane*8 | — | 30.0 |
| Alkoxysilane monomer | | (3.3%) |
| Ethoxysilane*2 | — | 12.0 |
| Reactive emulsifier | (5.1%) | (5.6%) |
| JS-2*4 | 52.6 | 52.6 |
| Polymerization initiator | | |

TABLE 3-continued

|  | Comparative Example | |
|---|---|---|
| Raw material | 1 | 2 |
| Hexanoate*7 | 3.0 | 3.0 |
| Deionized water | 601.6 | 592.4 |
| Total | 1,050.0 | 1,050.0 |

Notes: *1, *2, *4, *7 and parenthesized values have the same meanings as those in notes to Table 2.
*8 stands for non-reactive dimethylpolysiloxane.

The water-based resin dispersions obtained in Examples and Comparative Examples were measured for polymerization stability and particle diameters, and Table 4 shows the results. Further, resin coatings were prepared from the water-based resin dispersions containing a film-forming aid, etc., and tested for durability against water, freezing and melting resistance, chemical resistance and resistance against accelerated pollution. Table 5 shows the results.

Test methods
1. Preparation of coating
   A water-based resin dispersion was adjusted to MFT of 0° C. with a film-forming aid (Texanol).
2. Method of test for durability against water A
   A water-based resin dispersion was applied to a glass plate with a 10-mil applicator, and the applied water-based resin dispersion was dried at room temperature for 24 hours, then immersed in warm water having a temperature of 50° C. for 3 hours, and visually evaluated for a degree of whitening.
   Evaluation ratings
   5: Excellent (no whitening)
   1: Defective (Extreme whitening was observed all over the surface.)
3. Method of test for durability against water B
   A water-based resin dispersion was applied to a slate plate with a brush to form a coating having a thickness of 0.5 mm, and the coating was dried at room temperature for 72 hours, then immersed in warm water having a temperature of 50° C. for 7 days and visually evaluated for blisters, etc.
   Evaluation ratings
   5: Excellent (no defects)
   1: Defective (An extreme change in appearance was observed all over the surface.)
4. Method of test of freezing and melting resistance
   A coating was immersed in water at 20° C. for 2 hours and then immersed in water at −20° C. for 2 hours, and this procedure was taken as one cycle. This cycle was carried out 30 times, and the coating appearance was visually observed and also observed with a magnifier.
   Evaluation ratings
   5: Excellent (no defects)
   1: Defective (An extreme change in appearance
5. Chemical resistance
   A water-based resin dispersion was applied to a glass plate with a 10-mil applicator, and the applied water-based resin dispersion was dried at room temperature for 24 hours, then immersed in a sodium hydroxide aqueous solution for 24 hours, and visually evaluated for a degree of whitening.
   Evaluation ratings
   5: Excellent (no whitening)
   1: Defective (Extreme whitening was observed all over the surface.)
6. Method of test on resistance against accelerated pollution
   A water-based resin dispersion was applied to a slate plate with a brush to form a coating having a thickness of 0.5 mm, and the coating was dried at room temperature for 72 hours. Then, a kneaded mixture containing Vaseline and carbon black in a Vaseline/carbon black mixing ratio of 9/1 was uniformly applied to the dried coating with a brush, and the slate was allowed to stand at 50° C. for 24 hours. The applied mixture was wiped off with gauze and then the coating was visually evaluated for a degree of soiling.
   Evaluation ratings
   5: Excellent (no defects)
   1: Defective (An extreme change in appearance was observed all over the surface.)

TABLE 4

|  | Example | | | | | | Comparative Example | |
|---|---|---|---|---|---|---|---|---|
|  | 1 | 2 | 3 | 4 | 5 | 6 | 1 | 2 |
| Polymerization stability | O | O | O | O | O | O | O | O |
| Particle Diameter (nm) | 68 | 62 | 52 | 65 | 63 | 70 | 58 | 55 |

TABLE 5

|  | Durability against water A | Durability against water B | Freezing and drying | Chemical resistance | Pollution resistance |
|---|---|---|---|---|---|
| Ex. 1 | 5 | 5 | 5 | 5 | 5 |
| Ex. 2 | 5 | 5 | 5 | 5 | 5 |
| Ex. 3 | 5 | 5 | 5 | 5 | 5 |
| Ex. 4 | 5 | 5 | 5 | 5 | 5 |
| Ex. 5 | 5 | 5 | 5 | 5 | 5 |
| Ex. 6 | 5 | 5 | 5 | 5 | 5 |
| CEx. 1 | 2 | 3 | 1 | 3 | 1 |
| CEx. 2 | 3 | 5 | 3 | 3 | 4 |

Ex. = Example, CEx. = Comparative Example

INDUSTRIAL UTILITY

The water-based resin dispersion of the present invention can be applied to a variety of substrates such as a synthetic resin, a metal, glass, ceramic, gypsum, paper, wood, leather, etc., without applying an undercoat. Further, when the water-based resin dispersion of the present invention is applied to a variety of inorganic substrates such as light-weight concrete, light-weight cellular concrete, mortar, a calcium silicate plate, a slate, a plasterboard, and the like, it forms a coating excellent in durability against water, chemical resistance and pollution resistance.

The water-based resin dispersion of the present invention may contain colorants such as a dye and a pigment and a filler, and it is suitable as a coating composition for top coating, a coating composition binder, a paper processing agent and a fiber treating agent.

We claim:
1. A water-based resin dispersion having excellent durability against water, obtained by radical-polymerizing a radical-polymerizable ethylenically unsaturated monomer, a dimethylpolysiloxane having a molecule containing a radical-polymerizable unsaturated double bond and a radical-polymerizable monomer of the formula (A) or (B) in the presence of a reactive emulsifier, an oil-soluble polymerization initiator and water,

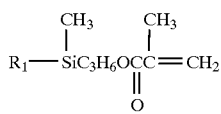

(A)

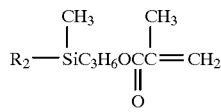

(B)

wherein $R_1$ is $(C_2H_5O)_2$ or $(CH_3O)_2$, and $R_2$ is $(C_2H_5O)_3$ or $(CH_3O)_3$.

2. A water-based resin dispersion having excellent durability against water according to claim 1, wherein the water-based resin dispersion is a product obtained by preparing oil drops having a size of 0.5 μm or less from the radical-polymerizable ethylenically unsaturated monomer, the dimethylpolysiloxane having a molecule containing a radical-polymerizable unsaturated double bond and the radical-polymerizable monomer of the formula (A) or (B) and adding the oil drops to a reaction system.

3. A water-based resin dispersion according to claim 1, wherein the water-based resin dispersion has an average particle diameter of 100 nm or less.

4. A water-based resin dispersion according to claim 1, wherein the oil-soluble polymerization initiator has a solubility in water of 0.3% by weight or less.

5. A water-based resin dispersion according to claim 1, wherein the radical-polymerizable ethylenically unsaturated monomer contains an ethylenically unsaturated monomer having a carboxyl group in an amount of 0 to 5% by weight as part of the radical-polymerizable ethylenically unsaturated monomer.

6. A process for the production of a water-based resin dispersion having excellent durability against water, which comprises preparing oil drops from a radical-polymerizable ethylenically unsaturated monomer, a dimethylpolysiloxane having a molecule containing a radical-polymerizable unsaturated double bond and a radical-polymerizable monomer of the formula (A) or (B) and adding the oil drops into water together with a reactive emulsifier and an oil-soluble polymerization initiator to proceed with radial polymerization, (A)

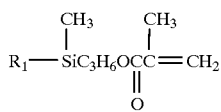

(B)

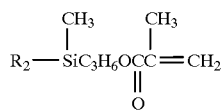

wherein $R_1$ is $(C_2H_5O)_2$ or $(CH_3O)_2$, and $R_2$ is $(C_2H_5O)_3$ or $(CH_3O)_3$.

7. A process according to claim 6, wherein the oil drops have a diameter of 0.5 μm or less.

8. A process according to claim 6, wherein the oil drops are prepared with a pipeline mixer.

9. A process according to claim 6, wherein part of the reactive emulsifier and part of the oil-soluble polymerization initiator are added to the water in advance and remaining portions of the reactive emulsifier and part of the oil-soluble polymerization initiator are dropwise added in the form of the oil drops.

10. A process according to claim 6, wherein the radical-polymerizable ethylenically unsaturated monomer contains an ethylenically unsaturated monomer having a carboxyl group in an amount of 0 to 5% by weight as part of the radical-polymerizable ethylenically unsaturated monomer.

11. A process according to claim 6, wherein the water-based resin dispersion has an average particle diameter of 100 nm or less.

12. A process according to claim 6, wherein the radical-polymerizable ethylenically unsaturated monomer contains at least one bifunctional monomer selected from ethylene glycol dimethacrylate, diallyl phthalate, divinyl benzene or glycidyl methacrylate, in an amount of 0 to 5% by weight as part of the radical-polymerizable ethylenically unsaturated monomer.

13. A process according to claim 6, wherein the radical-polymerizable ethylenically unsaturated monomer contains at least one monomer having an ethylenically unsaturated group selected from acrylamide, N-methylolacrylamide, hydroxyethyl acrylate, hydroxypropyl acrylate or hydroxyethyl methacrylate, in an amount of 0 to 10% by weight as part of the radical-polymerizable ethylenically unsaturated monomer.

* * * * *

UNITED STATES PATENT AND TRADEMARK OFFICE
CERTIFICATE OF CORRECTION

PATENT NO. : 5,916,963
DATED : June 29, 1999
INVENTOR(S) : Tomio HASHIMOTO

It is certified that error appears in the above-identified patent and that said Letters Patent is hereby corrected as shown below:

In the Abstract, formula (B) should read:

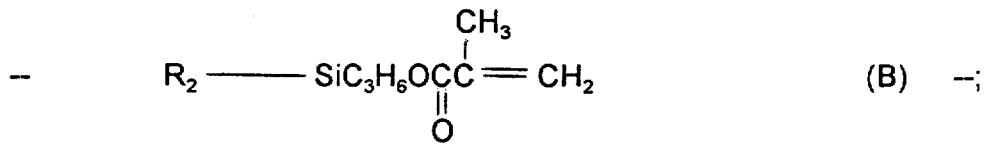

last line, "$(CH_3O)$" should read --$(CH_3O)_3$--.

In column 2, line 25, the formula B should read:

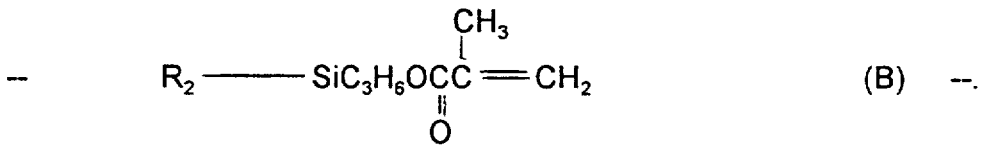

In column 3, lines 41 - 44, "β" should read --γ--.

In column 5, line 19, delete the term "Aquaron".

In column 6, line 52, change "nononizer" to --nanosizer--.

UNITED STATES PATENT AND TRADEMARK OFFICE
CERTIFICATE OF CORRECTION

PATENT NO.    : 5,916,963
DATED         : June 29, 1999
INVENTOR(S)   : Tomio HASHIMOTO It is certified that error appears in the above-identified patent and that said Letters Patent is hereby corrected as shown below:

In column 7, line 17, the term "γ" should be inserted before "Methacryloxypropylmethyldiethoxysilane".

In column 11, lines 8 - 13, formula (B) should read:

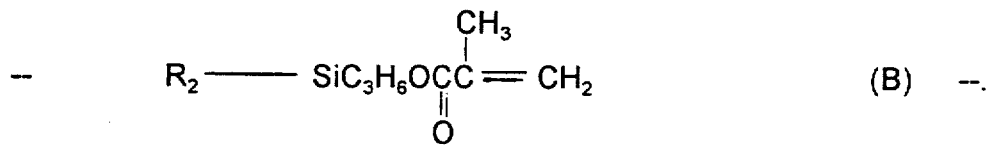

In column 12, lines 3 - 7, formula (B) should read:

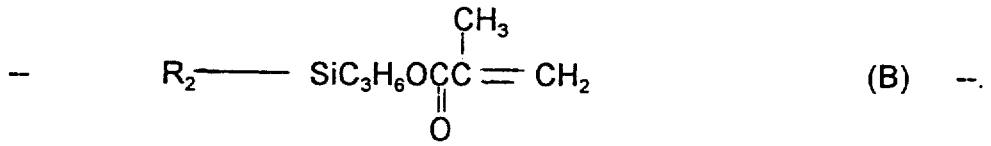

Signed and Sealed this

Second Day of May, 2000

*Attest:*

Q. TODD DICKINSON

*Attesting Officer*   *Director of Patents and Trademarks*